Dec. 27, 1938.    A. H. BRUNDAGE    2,141,903
FILTER UNIT
Filed Dec. 6, 1935    2 Sheets-Sheet 1

INVENTOR.
Alfred H. Brundage
BY Austin & Dix
ATTORNEYS

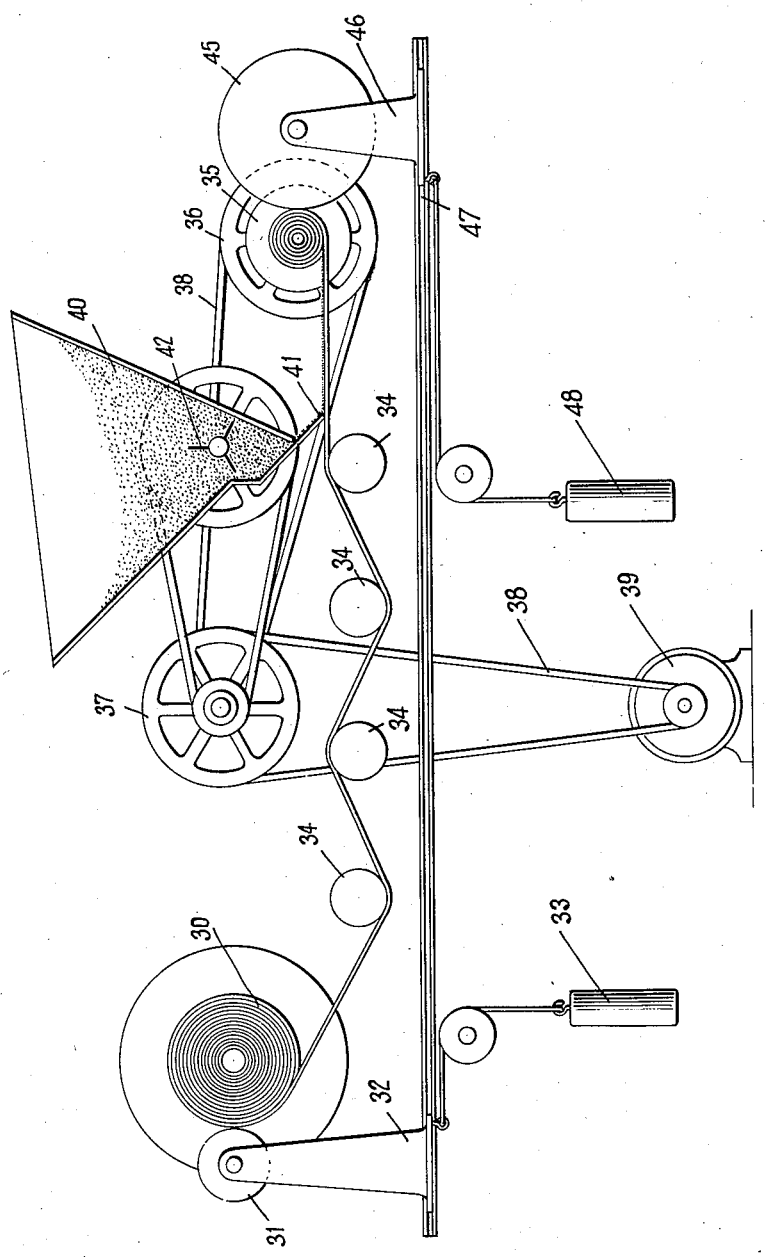

Patented Dec. 27, 1938

2,141,903

UNITED STATES PATENT OFFICE 2,141,903

FILTER UNIT

Alfred H. Brundage, Maplewood, N. J.

Application December 6, 1935, Serial No. 53,150

6 Claims. (Cl. 210—183)

This application is a continuation in part of my copending application Serial No. 3,929, filed January 29, 1935.

This invention relates to a novel filter and manner of making the same, and more particularly to an improved filter unit which contains particles of material such as activated carbon, silica gel, calcium chloride, or the like.

A feature of the invention resides in the provision of such a filter which is capable of treating a fluid to remove impurities therefrom, which filter is simple and relatively inexpensive to construct, and efficient in operation.

A further feature of the invention resides in the construction of a filter unit containing extremely finely divided material, such as activated carbon, and which is capable of insuring that all the fluid to be treated contacts the finely divided material without displacing or carrying the same out of the unit, and which affords a rapid filtering rate.

A more specific feature of the invention resides in providing a filter unit which contains finely divided filtering material and which is provided with means including fibrous material for arresting or entrapping fine particles without becoming clogged by them during normal periods of operation, and without becoming so matted that even and rapid flow of liquid is prevented, the finely divided material being held between layers of fibrous material wound on a core.

A further object of the invention lies in the provision of a filter construction which includes a combination of several or all of these features in a unitary, compact and inexpensive arrangement, and which is adapted to be readily connected to a source of supply, and easily and quickly replaced.

Another feature lies in a superior method of making filter units of the character described.

A particular adaptation of the present construction is for the purification of water from a city water supply, or other source, for drinking purposes, although it will be understood that the construction is useful for purifying other liquids, such as cleansing naphtha, alcohol, gin, perfumes and the like, where it is desired to employ extremely finely divided material as a filtering medium; and also for filtering gases.

In general, many features of the present invention are disclosed in my earlier application referred to above, but one particular additional and novel feature resides in placing finely divided material between successive layers of cotton faced with gauze, or like material, and more particularly, in the provision of a simple and effective construction for holding the finely divided material in place and at the same time, enabling a rapid filtering of liquids or other fluids, while preventing the finely divided material from working through into the filtrate.

Other features, objects and advantages of the present invention will in part become apparent and in part be pointed out in connection with the following detailed description of one form of construction illustrating the invention, reference being had to the accompanying drawings, wherein:

Fig. 5 is a diagrammatic front elevation of one form of device for wrapping a filter unit of present character and for incorporating in it finely divided material.

Figure 2:
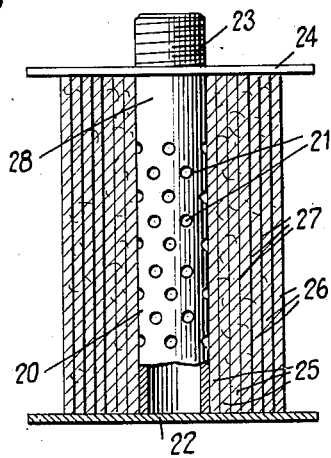
Fig. 2 is a central vertical section through the filter unit shown in Fig. 1.

Referring first to Figs. 1 to 4, the filter may include an inlet passage 10, an outlet passage 11, casing 12 and filter unit 13. These parts may be arranged in any convenient manner, but a satisfactory construction may include a round cover member 14 secured to the pipe and threaded as at 15 for engagement with the casing 12. The passage between pipes 10 and 11 may be blocked off as at 16 in any suitable way, and a threaded right angle portion 17 may be arranged to communicate with the outlet pipe 11 and to engage the filter unit as hereinafter described. Suitable passages 18 may be drilled or otherwise formed in the cover 14 and wall pipe 10 to permit water to flow into the casing, preferably so that it strikes a solid baffle, to break the force of the stream, before it reaches the filtering material.

The filter unit may comprise a central hollow core 20 formed of brass, aluminum or other rigid, inert material, and having a series of openings 21 in its side walls between the ends of the core. Secured across one end of the core is a rigid plate or flange 22 closing that end of the core. The other end of the core may be threaded as at 23 and a plate 24 may be secured to the core, being tightly fixed to the same below the threads.

Figure 3:
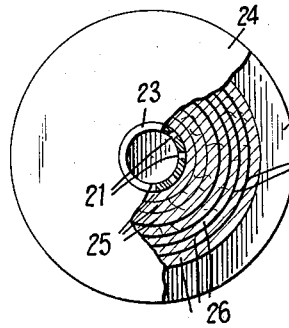
Fig. 3 is a top plan view, partly in section, of the unit shown in Fig. 2.
Figure 4:
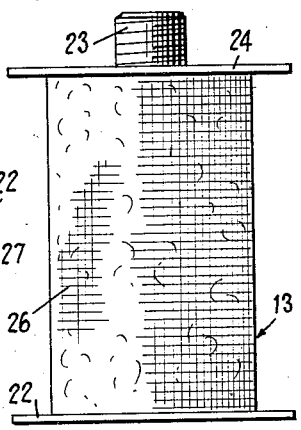
Fig. 4 is a front elevation of the filter unit.
Figure 1:
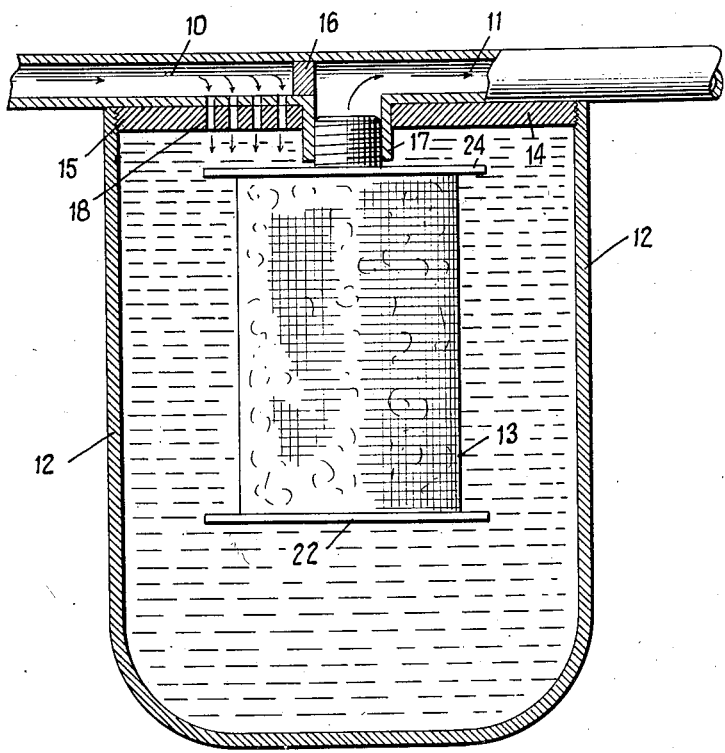
Fig. 1 is a front elevation, partly in section, showing a filter including a unit in accordance with the present invention.

As an example of means for holding finely divided material compactly in position, for assisting in removing solids from the fluid treated, and for preventing fines from passing into the filtrate, the following form of construction has many advantages. As best shown in Figs. 2 and 3, there is preferably wrapped on the core, in spiral fashion, a strip of cotton wadding or the like faced with gauze, cheesecloth or other open-mesh textile fabric. The wadding is advantageously normally loose, fluffy material of the type in use for filtering milk or for surgical supplies, though preferably not treated to make it absorbent. It should advantageously be of substantial thickness, say, one-eighth to one-quarter inch in its fluffy or uncompressed condition, and is preferably overlaid or faced with one or more layers of textile gauze. It is advantageous to employ a relatively long fibre cotton, and an ordinary 20-mesh gauze is satisfactory, although other similar materials may be used. For instance, cotton wadding may have one face highly glazed, to form a relatively tough, closely compacted surface, and where this type of material is employed for use with fluids such as gases under low pressures, the glazing may substitute for the gauze.

Close to the core 20 the fibrous material is preferably highly compressed, so that its thickness when wound on the core is but a small fraction of its thickness when in normally loose, fluffy condition. While I do not wish to be limited to any particular details in this respect, at least in the broader aspects of the invention, I have found it advantageous to wrap at least four and preferably more than eight layers of the wadding faced with gauze closely around said core so that the thickness of about four to eight layers, depending on the thickness of the wadding, is less than about a quarter of an inch. In this manner, there is provided adjacent the core a plurality of layers of normally loose, compressed fluffy material which is capable of preventing finely divided particles from passing through into the filtrate, even though many of the particles are of a size less than 200 mesh. After a number of turns of a continuous strip of fibrous material overlaid with gauze have been wrapped upon the core, the finely divided material may be interposed between the successive layers of the same strip of material, preferably in a continous spiral so that between the successive layers there will be a good thickness of material such as activated carbon or other substance adapted to assist in removing impurities from the fluid being filtered, this finely divided material being firmly held between the layers of the winding. Any convenient number of alternate layers of finely divided material and winding may be used depending upon the specific conditions to be encountered, or, in other words, the nature of the liquid to be filtered and the impurities in it. For many purposes, for instance, for drinking water, it will be found satisfactory to employ about four yards of winding material, and to incorporate the finely divided material following about eight turns of the winding, and up to the last turn on the outside of the winding. It is preferable to wind the cotton and gauze or similar material under a substantial tension, not only in the initial turns, but also in the turns in which finely divided material is incorporated. This tension may vary considerably but is preferably such as to wind the cotton and gauze with about the force of a strong but not over-exerted manual pull. In other words, the tension during the winding may be such that the cotton is compressed in each layer to a small fraction of its initial thickness as indicted, but not too strong to result in tearing or disconforming the cotton so as to produce voids in it.

For instance, as shown in Fig. 2, there may be employed several layers 25 of cotton or the like faced with gauze, and free of finely divided material, lying close to the core 20, while between the following layers 26 there may provided a spiral, preferably continuous and of substantial thickness, consisting of any suitable material such as activated carbon, calcium chloride, zeolites, or the like. While the amount of finely divided material may vary considerably, it is preferred to employ a continuous layer of substantial thickness, so that all portions of the fluid treated have to contact the material before reaching the core 20. When more spirals are used, the finely divided material may be somewhat thinner, and correspondingly where fewer spirals are used, more of the finely divided material should be incorporated in each turn. In general, however, enough activated carbon or the like should be employed to completely cover the winding material on which it is spread.

By employing winding material of the character described, extending the full width between the end members 22 and 24, by incorporating the carbon across the full width of the winding material, and by forming the ends of the core solid as at 28, the winding material is packed tightly between the ends of the core, and the fluid to be filtered all must pass through the filtering material before it can reach the center of the core or outlet passage. Moreover, the employment of fibrous material faced with gauze, or the like, enables the material to be wound under tension so that the cotton or the like is compressed to the proper degree for different operating conditions, depending upon the particular fluid to be filtered and the particular finely divided material employed in the unit. Moreover, by facing the cotton with textile gauze, the individual layers of cotton may all be made relatively thin, and satisfactory for present purposes. As is especially important where liquids are to be rapidly passed through the filter, the tendency of the cotton to form a solid mat when soaked with liquid is reduced to a minimum. At the same time, channeling is avoided, or, in other words, the cotton remains uniform throughout each layer, and the formation of voids or open spaces is forestalled. Furthermore, the finely divided material is held in place so that on the one hand it is not carried through into the filtrate, and on the other hand, it does not choke up the cotton and prevent a rapid flow of liquid.

While I do not wish to be restricted to any particular theory of operation, it appears that the compressed normally loose fibrous material possesses a capillary attraction for the smallest particles of finely divided material, many of which are so small as to pass a 200-mesh screen.

Furthermore, the present winding material is particularly adapted to be wound under tension on a core of the character described and may be wound under considerable force or tension without disturbing the even distribution of the cotton, and at the same time without tearing the latter.

As indicated above, while the present construction is particularly adapted for filtering water to purify it for drinking purposes, it is also adapted for many other uses. When used for filtering water, the filter is particularly advantageous since it permits a five-gallon bottle to be rapidly filled in a little over a minute while a single unit may be used without excessive deterioration for filtering about eight hundred gallons of water. When the filter unit is to be replaced, it is merely necessary to remove the casing 12, and thread another unit into position in the sleeve 17.

While I have mentioned a number of uses of the present filter, it will be understood that it may be feasible to employ the present development, possibly somewhat modified, for filtering other fluids, such as milk, in which case the finely divided material may be composed of somewhat larger particles such as crushed granite, and the cotton or the like may be relatively loose or uncompressed. It may also be used for removing moisture from gases, when calcium chloride can replace the activated carbon ordinarily used for purifying drinking water. The filter may also be used for such various purposes as removing obnoxious gases such as hydrogen sulfide from air and for separating chlorine from liquids which have been treated with it. However, the invention in its broader aspects is not restricted to any particular use.

Referring now to Fig. 5, there is shown in diagrammatic fashion a suitable machine for manufacturing filter units of the present character. The cotton or like material faced with gauze may be supplied on a suitable roll or bobbin as indicated at 30, any convenient device, such as roller 31 mounted on sliding support 32 under the force of weight 33, being employed for imposing a drag on the feed roll. From the feed roll the winding material may pass between a series of staggered rollers 34 which aid in placing the material under tension and holding it taut. The core or spool 35, upon which the winding material is spiralled, may be mounted on a suitable driven shaft in any convenient manner, and this shaft may be driven through suitable belts and pulleys 36, 37 and 38, from a motor 39. A hopper 40 may serve to spread the finely divided material upon the winding material as at 41, a stirrer 42 being desirably provided. The finely divided material is fed onto the winding material as indicated and is wound between the successive layers, the lip of the hopper being wider than the winding material so as to insure a full distribution of the finely divided material. In order to insure a tight winding at all times, there may be provided a heavy roller 45 mounted on supports 46 which are adapted to slide in suitable grooves 47 under the action of a weight 48 which tends to constantly pull the roller 45 against the material being wound upon the core 20 between the end plates thereof. Furthermore, the finely divided material is positively held between the layers of winding material so that it is not displaced in use, to leave voids.

While the perforations 21 in the solid core upon which the winding material is spiralled may advantageously be of about the size indicated, it will be appreciated that somewhat smaller or larger openings may be provided. When larger openings are employed it may be desirable to surround the core with a wire mesh screen, to avoid any tendency of the winding material to pack solidly into the openings.

Through the present invention, there is provided a simple, inexpensive and efficient filtering unit which may be readily replaced at will and which can be manufactured in a practical and effective manner. The compact, but not excessively compact character of the winding material employed enables this material to hold extremely fine solid particles (in the order of 200 mesh), whether in the carbon or the like, or in the fluid, and prevents their passing into the filtrate, while minimizing the tendency of these particles to clog up the filter, so that the rate of filtration is reduced. Moreover, the filtering material is firmly held in between the successive layers of winding material so that the unit may be manufactured at the factory and installed by any user at the place of use without any difficulty. Furthermore, the wrapping material is capable of being wrapped under considerable tension while its uniform character is not adversely affected. In addition, the fluid to be filtered has to pass through a number of successive layers of the filtering material and winding material so that all the fluid comes in contact with the fine particles, and so that the fluid which has been treated by the outside layer of large cross-sectional area subsequently contacts relatively fresh material forming the inner layers of smaller area, which makes efficient use of the compact filter. Moreover, the filter is constructed so that the water flowing from the outside toward the inside tends to compress the winding material and thus assists in holding the various materials in desired relation even though liquid is supplied under considerable pressure and at a high rate of flow.

The terms and expressions which have been employed are used as terms of description and not of limitation, and there is no intention, in the use of such terms and expressions, of excluding any equivalents of the features shown and described, or portions thereof, but it is recognized that various modifications are possible within the scope of the invention claimed.

What I claim is:

1. In a filter unit of the character described, a rigid, hollow, perforate core, means to permit filtered fluid to pass out of one end of said core, winding material comprising normally cotton wadding faced with textile gauze, wrapped in compressed form in a number of spirals closely adjacent said core, and finely divided material carried between outer spirals of said winding material, said outer spirals of winding material being wound under tension and substantially compressed, whereby said finely divided material is maintained in position between successive layers of the winding material.

2. In a filter for purifying water for drinking purposes, a casing, a perforate, rigid core carried centrally within the casing, an outlet passage communicating with the interior of said core, a plurality of alternate layers of cotton and cheesecloth wrapped tightly round said member, whereby said cotton is maintained in compressed relation, and finely divided filtering material carried in continuous layers between layers of cotton spaced from said core.

3. In a unit adapted for use in liquid filters for permitting the passage of liquid and for arresting fine particles of filtering material, a central core, winding material on said core comprising a continuous strip of normally loose, fluffy cotton wadding overlaid with textile gauze, said wadding and gauze being tightly wound with said wadding compressed adjacent said core to a small fraction of its normal thickness, and finely divided material firmly held between outer layers of said winding material whereby said wadding is capable of arresting particles of filtering material of the size adapted to pass a screen in the order of 200 mesh, and whereby said gauze prevents exclusive matting of the wadding.

4. As an article of manufacture, for use in filters, a central core, means wound tightly on said core in spiral fashion comprising cotton wadding, said wadding being overlaid with a continuous strip of textile mesh material lying between successive layers of the wadding, and finely divided material held between outer layers of said means, said wadding being compressed adjacent said core from a normal thickness in the order one-eighth to one-quarter of an inch, to less than about half its initial thickness.

5. In a filtering unit, a filtering structure comprising a core having a series of openings therein, a solid end plate mounted on one end of said core, a second end plate solid except for its sliding over the other end of said core and being mounted on said core at a relatively short distance from the end thereof, means on the free end of said core for attaching the filter structure to a filtering unit, a series of layers of meshed filtering material positioned between said plates and adjacent said core and tightly affixed thereto, a series of layers of fluffed material mounted between said plates and around said meshed material, and finely divided activated carbon carried between the series of said fluffed material.

6. A filtering unit comprising a case, a closure for said case, a liquid inflow conduit leading into said case, a liquid outflow conduit leading from said case, and a filtering structure mounted within said case and attached to lead only filtered material into said outflow conduit whereby the inflow liquid must pass through said filtering structure before reaching said outflow conduit, said filtering structure comprising an open core provided with perforations, a closed plate affixed to one end of said core, means on the other end of said core for affixing said filter structure to have the filtered material pass only to said outflow conduit, a second plate mounted on said core near said affixing means, a series of meshed filtering material tightly affixed around said core between said plates, a fluffy filtering material affixed around the meshed material, and finely divided activated carbon distributed throughout said fluffy material.

ALFRED H. BRUNDAGE.